Feb. 20, 1934.  F. L. BOYNTON  1,948,095
DIFFERENTIAL GEARING
Filed Jan. 19, 1933  2 Sheets-Sheet 2
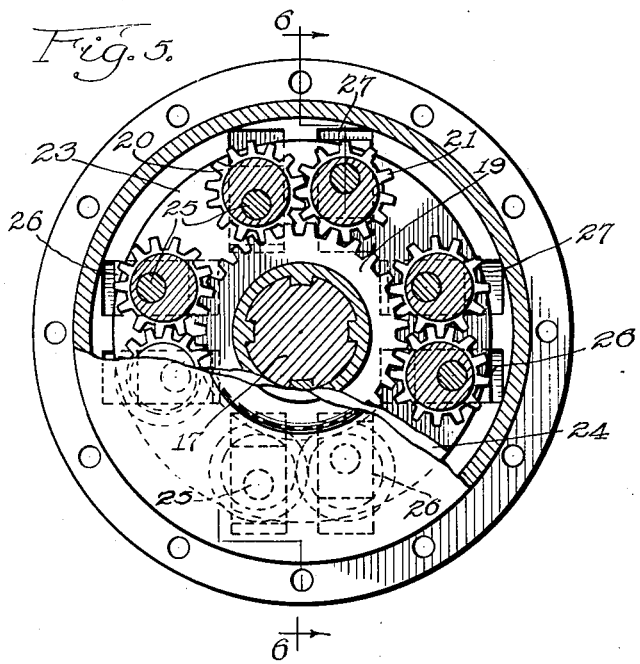
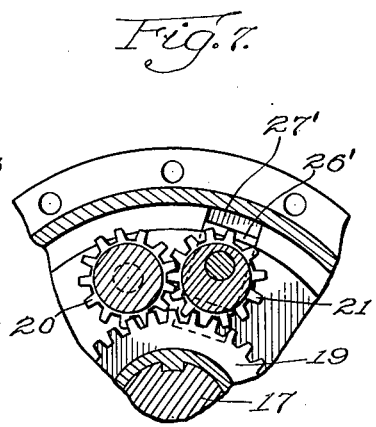
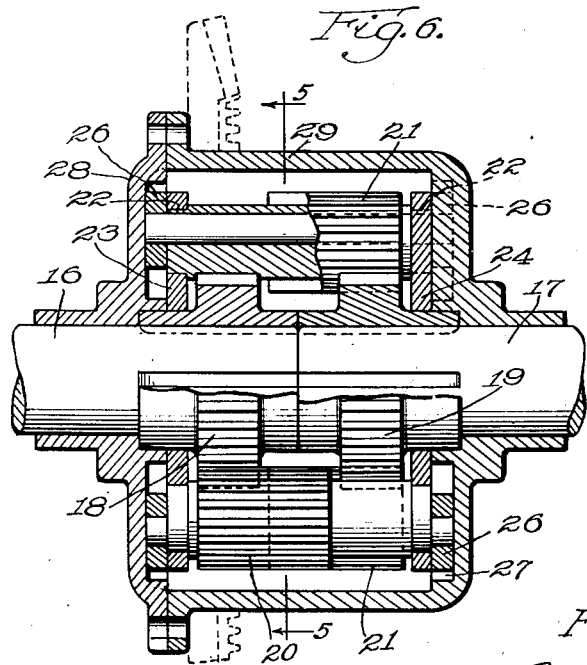
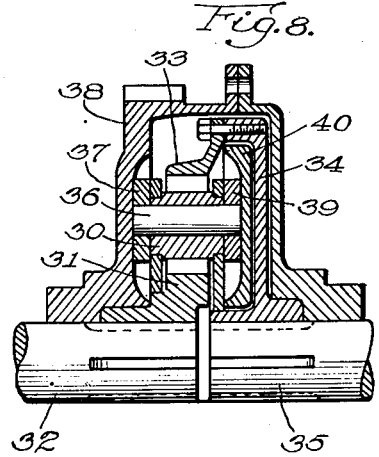
Inventor
Frederick L. Boynton.

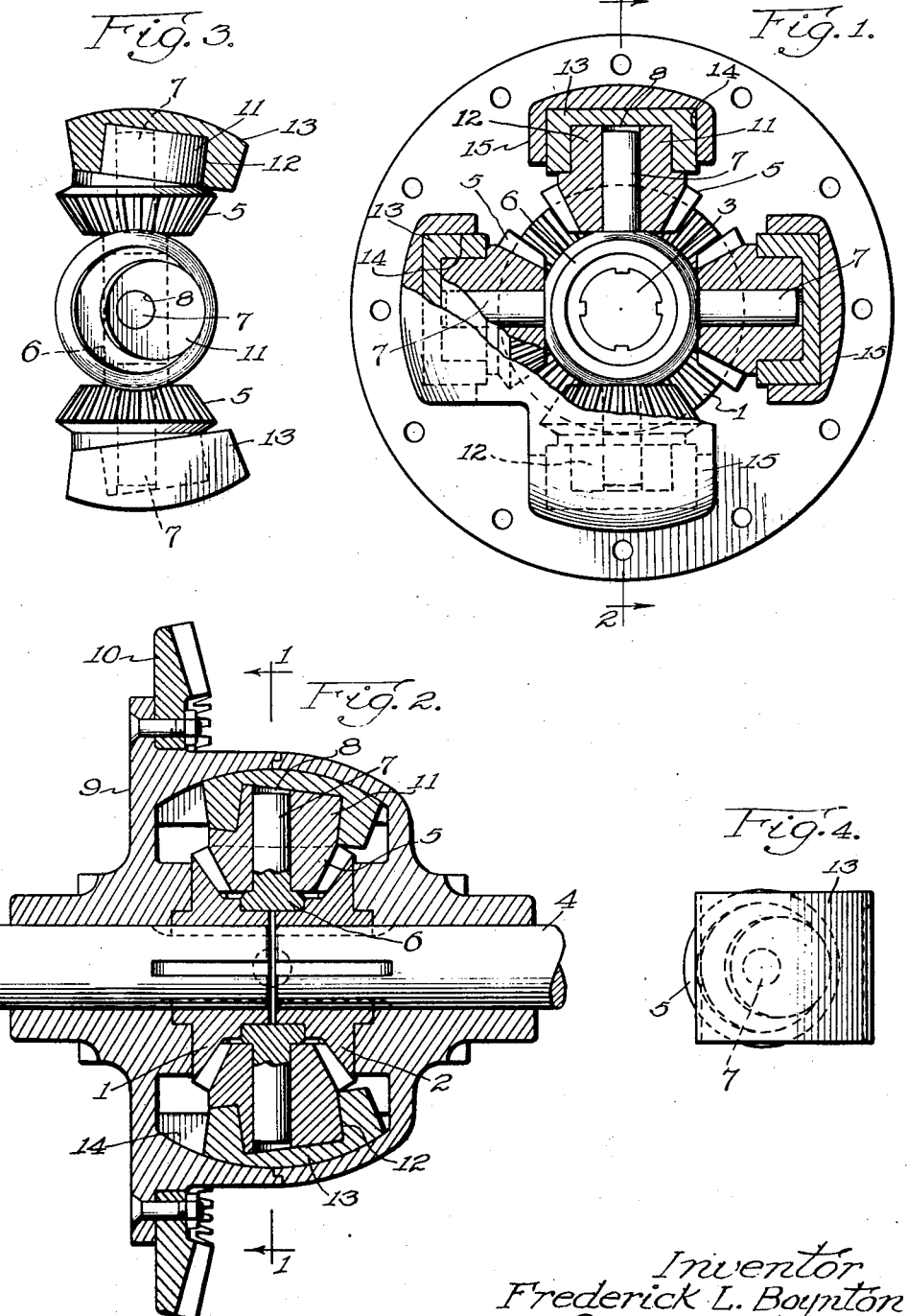

Patented Feb. 20, 1934

1,948,095

UNITED STATES PATENT OFFICE 1,948,095

DIFFERENTIAL GEARING

Frederick L. Boynton, Sycamore, Ill., assignor to Mary E. Boynton, Sycamore, Ill.

Application January 19, 1933. Serial No. 652,503

2 Claims. (Cl. 74—99)

This invention is an improvement in and relates to vehicle gearing of the class described in the patent to Boynton No. 1,888,656, issued November 22, 1932.

The purposes of the present invention are to provide a gearing which closely approximates in its design and principal elements the differential gearing now most commonly used in vehicle drives, but having the added characteristics of resisting differential action between driven axles in proportion to the tendency of such axles to rotate at different speeds, and at times of differential action, to alternatively impart slight variations in the torque applied to the two axles so that the vehicle may get under way more readily in case of unfavorable conditions of the road surface.

These objects are accomplished by a construction as illustrated in the drawings, wherein:

Figure 1 is a face view of the gearing partly broken away and in section, the parts in section being along the line indicated by 1—1 of Figure 2.

Fig. 2 is a transverse sectional view of the gearing as indicated by the line 2—2 of Fig. 1.

Fig. 3 is a plan view of the pinion-carrying spider and pinions thereon and also includes a pair of slide members, one of which is indicated in section.

Fig. 4 is a plan view of one of the slides, the eccentric which operates the slide being shown by broken lines.

Fig. 5 is like Fig. 1 except that it shows the invention applied to a spur gear differential.

Fig. 6 is a longitudinal sectional view taken upon the line 6—6 of Fig. 5.

Fig. 7 is a fragmentary detail illustrating a modification of the construction illustrated by Figs. 5 and 6.

Fig. 8 is a fragmentary view to illustrate the invention as applied to planetary spur gear differentials having internal and external gears of unequal diameters and particularly useful where it is desired to normally apply more torque to one of the driven axles than to the other.

The invention may be carried into practice by a construction which, in its principal mechanical elements, is like standard or well known forms of differential gearing, designed particularly for use in road vehicles; that is, it includes the usual frame structure to which the ring gear is attached and within which are mounted the driven gears of the differential gearing. The driven gears are each splined to one of the driven axles and are connected together by intermediate planetary pinions mounted on a spider connected with the frame structure to revolve as a unit therewith and with a ring gear.

The improved differential gearing is a departure from this common way of constructing differential gearing by the connection between the intermediate unit and the casing which revolves such unit. This casing is provided with ways on its inner surface for the reception of slide blocks which fit these ways and also fit eccentrics on the intermediate pinions. The blocks serve to transmit the driving torque from the frame structure to the pinions so that the latter and their supporting spider will be carried around with the frame as usual, but when the pinions rotate on their axes in response to differences in the resistance or loads encountered by the driven axles, the blocks must slide back and forth along the ways in the frame structure.

To impart this sliding motion to the blocks, of course takes power in proportion to the rate of reciprocation thereof and thus the resistance to differential action is built up in proportion to any tendency for either axles to race.

Patent No. 1,888,656, above mentioned, is directed mainly to a gearing which automatically changes the leverage or gear ratio between the driven axles at times of differential action. This change in leverage is not of large value but is sufficient to impart added impulses to the axle tending not to rotate because of the freedom with which the companion axle may rotate under some conditions. These impulses are alternately applied to the two driven axles so that there is less tendency for either axle to absorb all of the energy when the vehicle wheel driven thereby operates against poor traction conditions The patented construction also included an arrangement for amplifying the value of the resistance to differential action inherent therein and in proportion to the rate of differential action.

The present construction in principle is the same as the patented one, but this application for patent is directed mainly to the resistance features of the differential gearing, and to simplifications and improvements in the construction thereof.

With reference to the principal form of the invention, as illustrated by the drawings, Sheet 1 shows a well known type of beveled planetary gearing, the principal elements of which include the driven gears 1 and 2 respectively splined to the driven axles 3 and 4. The intermediate driving pinions 5 are carried by a central ring 6 having the integral radiating spider shafts 7, each of which fits an axle bore 8 in one of the pinions 5. This spider construction is rotated by the surrounding frame structure 9 to which the driving ring gear 10 is attached, but instead of the usual arrangement wherein the spider arms 7 extend outwardly from the pinions 5 and fit apertures in frame 9, the pinions are each provided with eccentric hubs 11 which fit journals 12, formed in reciprocating blocks 13 fitting ways 14 in frame structure 9.

Thus the rotation of the frame structure is imparted to the planetary pinions through the blocks 13. These blocks maintain fixed positions relatively to frame 9 when the respective loads on axles 3 and 4 are equal. When the load or resistance to rotation of one axle is greater than the restraining influence on the other axle, the intermediate pinions 5 roll accordingly on one of the gears 1 or 2. This rolling action results as usual in imparting different rates of speed to the driven axles, and the driven axles receive power in proportion to their respective loads.

In case of slippery road conditions, it is common with differential gearing for exactly what should not happen to take place. Power is converted into high speed rotation of the axle having the lesser load. Such undesirable action is overcome by the improved connection between the driving element 9 and the spider, or intermediate pinion unit.

The free rotation of the intermediate pinions upon their supporting shaft is restrained proportionately to the tendency of the pinions to so rotate, as each rotation thereof must, through the eccentrics on the pinions, force a complete oscillation of blocks 13 in ways 14. Such inertia is ideal for the purpose as little resistance is encountered at times of slow differential action and the inertia value rises probably according to the square of the speed of blocks 13.

For convenience in assembling the unit, the frame structure 9 may be a split casting bolted together to form a rigid unit with openings so that oil may freely enter and reach the gears.

The ways 14 are formed in the bridging portions 15 of frame 9. The inner walls of the recesses 14 are curved longitudinally and the outer surfaces of the blocks 13 have the same curvature.

The modifications illustrated by Sheet 2 of the drawings are applications of the invention to spur gear differentials and, in one form, the resistance to differential action is largely increased over the form illustrated by Fig. 1.

The modified constructions are the same in principle as the construction disclosed in applicant's Patent No. 1,888,656, and the improved form thereof illustrated by Sheet 1 of these drawings.

In the form illustrated by Figs. 5 and 6 the driven axles 16 and 17 have splined thereto the spur gears 18 and 19. Gears 18 mesh with a set of planetary pinions 20 and gears 19 mesh with a set of planetary pinions 21. The pinions 20 and 21 overlap and mesh in pairs for the purpose of reversing the motion transmitted by the pinions from one axle to the other when there is any differential motion between the axles. Otherwise the pinions are carried bodily in their orbits without relative rotation when driving both axles at the same speed.

The pinions have concentric bosses or hubs 22 which fit within circular openings in bearing discs 23 and 24 journaled on the hubs of gears 18 and 19. Each pinion is eccentrically apertured to carry the eccentric shafts 25 which at their ends fit circular apertures in slide blocks 26. These slide blocks fit grooves or ways 27 in the rotating frame structure formed of the two parts 28 and 29. Each pair of guideways is parallel to a radial line extending midway between the pair.

In the operation of the structure illustrated by Figs. 5 and 6, rotation of the ring gear carrying frame will, through the slides 26 and eccentric shafts 25, cause the pinions to revolve with the frame and without turning on their axes in case the loads on shafts 16 and 17 offer equal resistance to rotation of these shafts.

If one axle is retarded more than the other, then the pinions will start to roll upon the gear of the retarded shaft, turning upon their true centers as determined by the bearing discs 23 and 24. When the pinions roll, the eccentric shafts 25 passing through the pinions impart motion to the slide blocks 26. The latter are free to move relatively of the supporting structure 29 in a radial direction, but either follow the supporting structure or compel the latter to follow the slides in that part of the motion which is perpendicular to the radial.

Thus the frame structure will tend to fluctuate in speed at times of differential action, but since the power is applied to the gearing through the frame 29 the latter rotates at a substantially constant speed and the fluctuation in speed caused by the eccentrics becomes more apparent at the driven axles. The pinions alternately increase and decrease in rate of rotation to compensate for the eccentric motion of their shafts 25, and slightly change the leverage between the driven axles alternately in favor of one and then the other.

In vehicle differentials as at present employed, there is occasion for continuous variation in the rotation of the driven axles, but never for a large factor of differentiation even in making the sharpest turns possible.

The differential gearing herein described is responsive to any tendency of the driven axles to rotate at slightly differing speeds, but is highly resistant to rapid reciprocation of the slides 26 and guides 27 and therefor nearly equalizes the torque applied to the driven axles, even though one axle is performing far less useful work than the other.

In the modification illustrated by Fig. 7 only one pinion of each pair of pinions operates slide blocks 26'. In this case the guideways 27' extend truly radial to the center of the unit. The operation of this modified structure is the same as that occurring in the structure illustrated by Figs. 5 and 6 except that by having fewer slide blocks it offers less resistance to differential action.

Fig. 8 shows a modification further illustrative of the concept upon which applicant's patent above mentioned and this case are based. In this case an adaptation is made to meet the requirements of planetary gearing wherein spur gears are employed but all are in the same plane extending transversely of the axis of the unit.

In this case the intermediate pinions 30 are between an external gear 31 on axle 32 and an internal gear 33, secured to a disc 34 splined to axle 35. The eccentric shafts 36 operate slides 37 in radial guideways in the frame structure 38 and slides 39 in a sub-frame 40.

I claim:

1. Differential gearing comprising a pair of driven gears, a driving pinion intermediate said gears and meshing therewith; a supporting and driving element for said pinion arranged to impart a planetary motion to the pinion, said pinion being provided with an eccentric, and an element fitting said eccentric and slidably engaging the said support.

2. Differential gearing comprising beveled planetary driving pinions and beveled driven gears meshing with said pinions, a spider construction having radially extending shafts upon which the pinions are co-axially mounted, an eccentric carried by each of said pinions, slide members fitting said eccentrics, a rotary driving frame structure provided with ways within which said slide members fit.

FREDERICK L. BOYNTON.